United States Patent [19]

Schlagenhauf

[11] 4,362,051

[45] Dec. 7, 1982

[54] FUEL INJECTION NOZZLE HOLDER FOR INTERNAL COMBUSTION ENGINES

[75] Inventor: Josef Schlagenhauf, Esslingen, Fed. Rep. of Germany

[73] Assignee: Robert Bosch GmbH, Stuttgart, Fed. Rep. of Germany

[21] Appl. No.: 232,442

[22] Filed: Feb. 6, 1981

[30] Foreign Application Priority Data

Feb. 7, 1980 [DE] Fed. Rep. of Germany ....... 3004424

[51] Int. Cl.[3] .......... G01M 15/00

[52] U.S. Cl. .......... 73/119 A; 336/107

[58] Field of Search .......... 73/119 A; 339/47 R, 339/48, 49 R, 61 R, 248 S, 147 C; 336/107

[56] References Cited

U.S. PATENT DOCUMENTS 1,705,559 3/1929 Dubilier .......... 336/107 X
3,344,663 10/1967 Dreisin et al. .......... 73/119 A

*Primary Examiner*—Jerry W. Myracle
*Attorney, Agent, or Firm*—Edwin E. Greigg

[57] ABSTRACT

A fuel injection nozzle holder for internal combustion engines is proposed having an induction coil glued into an intermediate disc provided with two contact springs, which first are connected with the ends of the winding and second are embodied as contact tongues. Each tongue, together with an insulated wire lead, makes a releasable contact within the nozzle holder body.

10 Claims, 7 Drawing Figures

FUEL INJECTION NOZZLE HOLDER FOR INTERNAL COMBUSTION ENGINES

BACKGROUND OF THE INVENTION

The invention relates to improvements upon the fuel injection nozzle holder for internal combustion engines described and disclosed in U.S. application Ser. No. 166,924, assigned to the same Assignee as in the instant invention. Both of the ends of the winding on the induction coil are soldered to a contact element which is inserted, with an insulating sheath, into an insulating sheath secured in the intermediate disc. The soldered connection can only be effected after the induction coil and the insulating sheaths have been glued or inserted into the intermediate disc. This means that a soldering station for the intermediate disc must then be provided in the assembly line.

OBJECT AND SUMMARY OF THE INVENTION

The coil of the fuel injection nozzle holder for internal combustion engines as described by the main claim is a preassembled element, which is combined into a unit with the intermediate disc in a separate procedure before the nozzle holder is assembled. By means of an automatic soldering apparatus, both winding ends can simultaneously be connected to the associated contact tongues. Because the contact element and the insulating sheath are eliminated, the manufacturing costs for the intermediate disc are reduced.

As a result of the characteristics disclosed in the dependent claims, advantageous modification of and improvements to the fuel injection nozzle holder disclosed in the main claim can be attained. If the intermediate disc is embodied as described in claim 2, the adhesive surface area is enlarged, and its hold within the intermediate disc is thus increased.

The invention will be better understood and further objects and advantages thereof will become more apparent from the ensuing detailed description of preferred embodiments taken in conjunction with the drawings.

DESCRIPTION OF THE PREFERRED EMBODIMENTS

Figure 1:
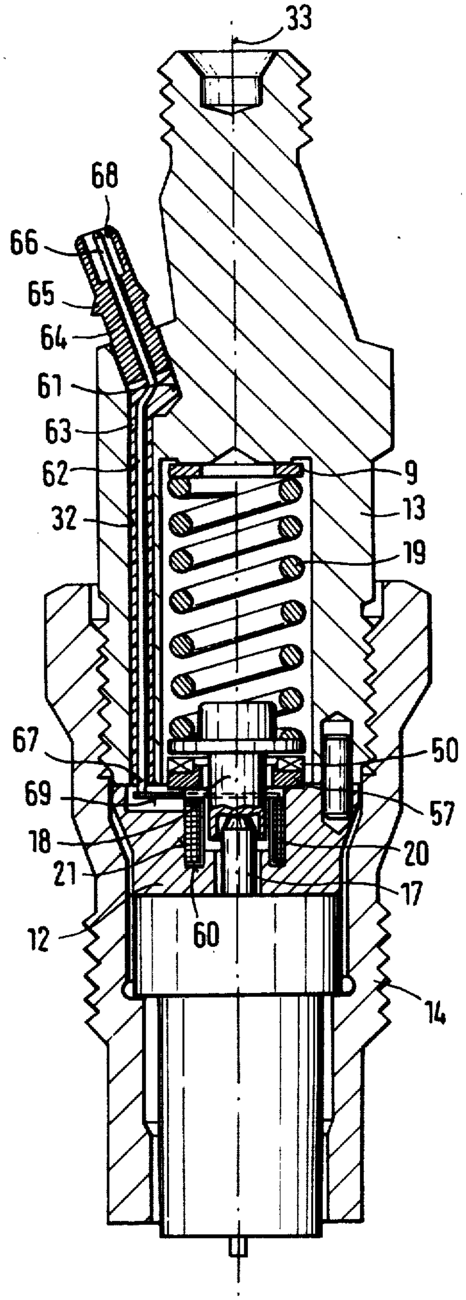
FIG 1, shows an axial section through the injection nozzle holder.

The fuel injection nozzle holder in FIG. 1 substantially comprises an intermediate disc 12, an adjacent nozzle holder 13, and a sleeve nut 14. A pressure tang 17 of a valve needle, not shown, rests with tension against a pressure bolt 18, and a compression spring 19 supported via a spring adjusting disc 9 on the nozzle holder 13 presses with pre-stressed force against the pressure bolt 18.

A recess 21 is disposed in the intermediate disc 12 opening toward the nozzle holder body 13. The recess includes an annular groove 60 provided in its end face. An induction coil 20 is glued into the intermediate disc 12, with the height of the coil and the axial length of the annular groove 60 being so dimensioned that the portion of the pressure bolt 18 receiving the pressure tang 17 protrudes approximately halfway into the coil, so that the pressure tang 17 of the valve needle and the lower portion of the pressure bolt 18 act as a coil core. An annular magnet 50 and a support ring 57 are secured on the intermediate disc 12.

A channel 32 is disposed in the nozzle holder body 13 approximately parallel to the axis 33 thereof, and a blind bore 61 communicates with the channel 32. A wire lead 62 is bent in such a way that it is disposed substantially coaxially in the channel 32 and in the blind bore 61. The channel 32 and the blind bore 61 are lined with a poured insulating compound 63, and at the same time an insertion plug 64 having an annular bulge 65 is molded on the nozzle holder 13. The wire lead 62, thus insulated in the nozzle holder body 13, has a first end 66 protruding into a pocket 68 in the insertion bolt 64, and a second end 67 protruding beyond the channel 32 to contact one of the two contact tongues 69 of the induction coil 20.

Figure 3:
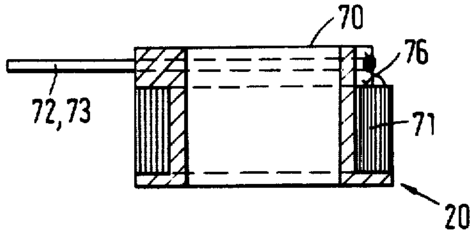
FIG. 3, shows a section taken along the line II—II of FIG. 2.
Figure 2:
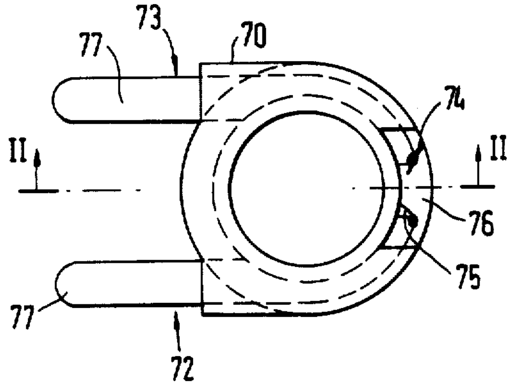
FIG. 2, shows the induction coil in plan view.

The induction coil 20 in FIGS. 2 and 3 substantially comprises a coil body 70 of insulating material, a winding 71, and first and second contact springs 72, 73. The coil body 70 has a recess 76 into which both the ends 74, 75 of the winding and the contact springs 72, 73 protrude, each end being connected with one spring by means of a soldering point. The opposite extremity of each of the two contact springs 72, 73 is embodied as a contact tongue 77, which extends approximately tangentially away from the coil body 70 and yields in the direction of the axis 33 (shown in FIG. 1).

Figure 4:
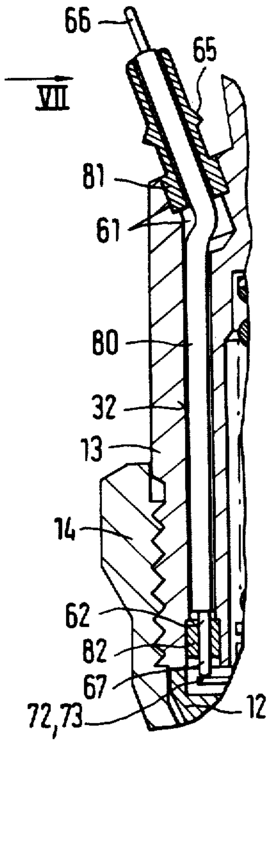
FIG. 4 shows in axial section a portion of a variant for guiding the wire lead.

The wire lead 62 in FIG. 4, except for its first and second ends 66, 67, is surrounded by a shrinkage hose 80. A prefinished insertion plug 81 is affixed first to the shrinkage hose 80 and second is disposed into the blind bore 61. A sealing ring 82 is inserted into the channel 32 of the nozzle holder 13 and surrounds the wire lead 62 in such a manner that the second end 67 of the wire lead contacts the first contact element 72 of the induction coil (not visible here) in the manner described above.

Figure 5:
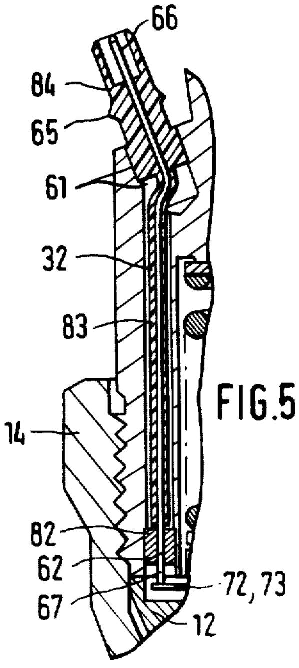
FIG. 5 shows in axial section a portion of a further variant for guiding the wire lead.

The wire lead 62 in FIG. 5 first has an insulation jacket 83 sprayed on it, then the insertion plug 84 in a separate procedure, then the lead is inserted into the channel 32 or blind bore 61, and finally, the insertion plug 84 is glued in the blind bore 61.

Figure 6:
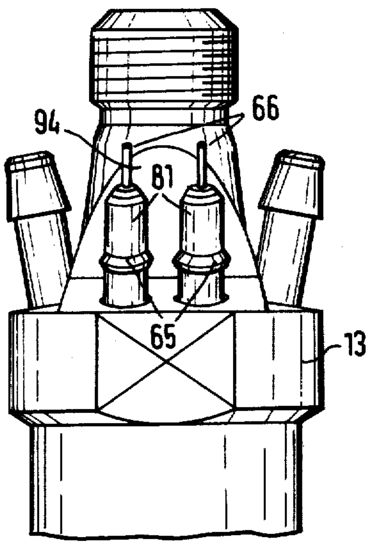
FIG. 6 shows a partial side view of the nozzle holder in the direction of arrow VII of FIG. 4.

FIG. 6 shows one end portion of the nozzle holder 13, with two insertion plugs 81 and the first ends, 66 of two lead wires, the second ends 67 of which are not visible.

Figure 7:
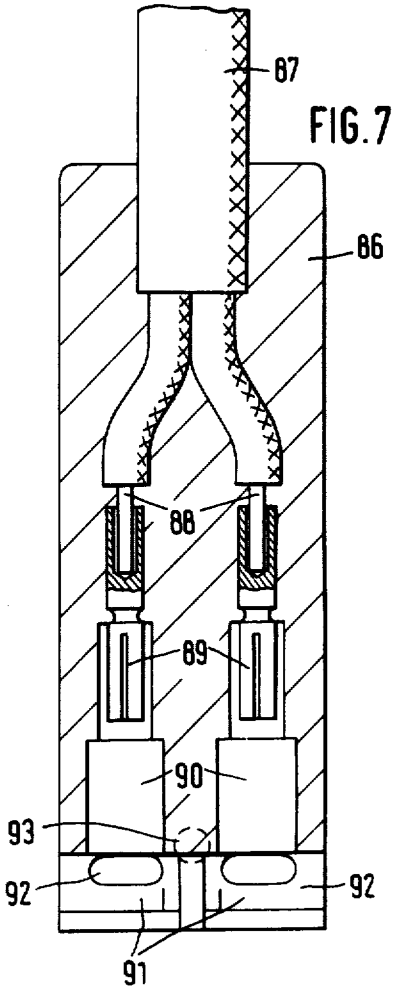
FIG. 7 shows a longitudinal section taken through a plug.

FIG. 7 shows a plug, an electrical line 87 embedded therein in an unremovable manner having two conductors 88, each of which is inserted into an insertion sleeve 89, which is likewise embedded in a coupling means. The 86 coupling means has two recesses 90 and two tongues 91, one of each of which is located above the plane of the drawings. Each tongue 91 has two openings 92, which cooperate with the annular bulges 65 of the insertion plugs 64, 84, 81 in the manner of a detent and thus assure the functional positioning of the coupling means 86. A protruberance 93 stands out from one side of the coupling means 86, so that the section 94 (FIG. 6)

of the nozzle holder 13 makes it possible for the coupling means 86 to be inserted only in a predetermined manner.

The foregoing relates to preferred exemplary embodiments of the invention, it being understood that other embodiments and variants thereof are possible within the spirit and scope of the invention, the latter being defined by the appended claims.

What is claimed and desired to be secured by Letters Patent of the United States is:

1. A fuel injection nozzle for Diesel internal combustion engines, having an induction coil including a winding attached to a housing and a reciprocable valve needle comprises a coil core, the stroke of said valve needle coil core arranged to vary the reluctance of the magnetic circuit of the induction coil and thereby generate a signal, said induction coil secured in an intermediate disc member which abuts a nozzle holder and a pressure element and said valve needle form said coil core, characterized in that first and second contact springs are embedded in said induction coil, each of said contact springs having end portions, one end portion of which springs forms a substantially tangentially extending contact tongue, and another end portion of which springs protrudes into a recess in said induction coil for connection with said winding.

2. A nozzle holder as defined by claim 1, further having a recess in said intermediate disc which is open toward the nozzle holder body, further characterized in that said recess has an end face provided with annular groove arranged to partially receive said coil.

3. A nozzle holder as defined by claim 1, said nozzle holder body having a channel and a wire lead insulated therein, which lead cooperates with said contact tongue and is connected with a plug connection, further characterized in that a shrinkage hose surrounds the wire lead, said lead further provided with at least one insertion plug, said plug affixed to an exteriorly-projecting end of said wire lead, and further that said insertion plug is positively mounted in said nozzle holder body.

4. A nozzle holder as defined by claim 3, characterized in that said wire lead is further provided with a sealing ring, arranged to be inserted into said nozzle holder body.

5. A nozzle holder as defined by claim 3, further characterized in that said at least one insertion plug comprises two members each of said members having a jacket provided with an annular bulge thereon.

6. A nozzle holder as defined by claim 3, further including coupling means provided with an electrical line terminating in two plug sleeves and two opposed tongues each of said tongues having an aperture adapted to receive said annular bulge as a detent means.

7. A nozzle holder as defined by claim 6, characterized in that said coupling means includes an offstanding protuberance, said protuberance being adapted to engage said annular bulge in a predetermined relative position therebetween.

8. A nozzle holder as defined by claim 1, said nozzle holder body having a channel and a wire lead insulated therein, said lead arranged to cooperate with said contact tongue and connected with a plug connection, further characterized in that said wire lead is provided with a molded-on insulating jacket and a molded-on insertion plug, said plug being positively-mounted in the nozzle holder body.

9. A nozzle holder as defined by claim 8, characterized in that said wire lead is further provided with a sealing ring, arranged to be inserted into said nozzle holder body.

10. A nozzle holder as defined by claim 1, said nozzle holder body having a channel and a wire lead insulated therein, said lead arranged to cooperate with said contact tongue and connected with a plug connection, further characterized in that said channel is arranged to receive said wire lead, and is lined with a poured insulating compound and said insertion plug is molded onto the nozzle holder.

* * * * *